United States Patent
Bjorklumd

[15] 3,678,979
[45] July 25, 1972

[54] SEALING WASHER
[72] Inventor: Lowell L. Bjorklumd, Elgin, Ill.
[73] Assignee: Illinois Tool Works Inc., Chicago, Ill.
[22] Filed: Dec. 17, 1969
[21] Appl. No.: 885,902

[52] U.S. Cl. .............................................. 151/37, 85/1 JP
[51] Int. Cl. ................................................... F16b 39/26
[58] Field of Search .................... 151/37, 38, 35; 85/1 JP, 50, 85/32 W

[56] References Cited

UNITED STATES PATENTS

| | | | |
|---|---|---|---|
| 1,719,301 | 7/1929 | Metcalf | 151/69 |
| 3,331,272 | 7/1967 | Hanneman | 85/32 R |
| 2,176,411 | 10/1939 | Washer | 85/50 |
| 2,659,125 | 11/1953 | Williams | 151/38 |
| 2,681,678 | 6/1954 | Hage | 151/37 |
| 2,794,476 | 6/1957 | Hanneman | 151/38 |
| 2,943,661 | 7/1960 | Stern | 151/38 |
| 2,965,146 | 12/1960 | Cox | 151/37 |
| 2,981,651 | 4/1961 | Arnold | 85/1 JP |
| 3,425,473 | 2/1969 | Knowlton | 85/50 |
| 3,422,721 | 1/1969 | Yonkers | 85/1 JP |
| 3,500,712 | 3/1970 | Wagner | 85/1 JP |

FOREIGN PATENTS OR APPLICATIONS

| | | | |
|---|---|---|---|
| 570,438 | 1/1924 | France | 85/32 W |
| 672,178 | 10/1964 | Italy | 151/37 |

OTHER PUBLICATIONS

Nut and Lockwasher – on page 203, 205 of Machine Design Vol. 33, No. 4, Feb. 16, 1961.

*Primary Examiner*—Marion Parsons, Jr.
*Attorney*—Olson, Trexler, Wolters & Bushnell, Robert W. Beart, Michael Kovac, Barry L. Clark and Jack R. Halvorsen

[57] ABSTRACT

The present invention relates generally to fastener units consisting of a rotary threaded fastener such as a nut, and a combined spring washer and sealing washer adjacent the clamping surface of the nut, said combined washers being tiltable with respect to the fastener axis. The fastener unit disclosed herein comprises a nut and a combined spring washer and sealing washer adjacent the clamping surface the nut, said spring washer having an aperture sufficiently larger than the maximum diameter of the fastener threads to permit tilting of the washer with respect to the axis. The washers are secured against unauthorized axial separation from the nut.

1 Claim, 7 Drawing Figures

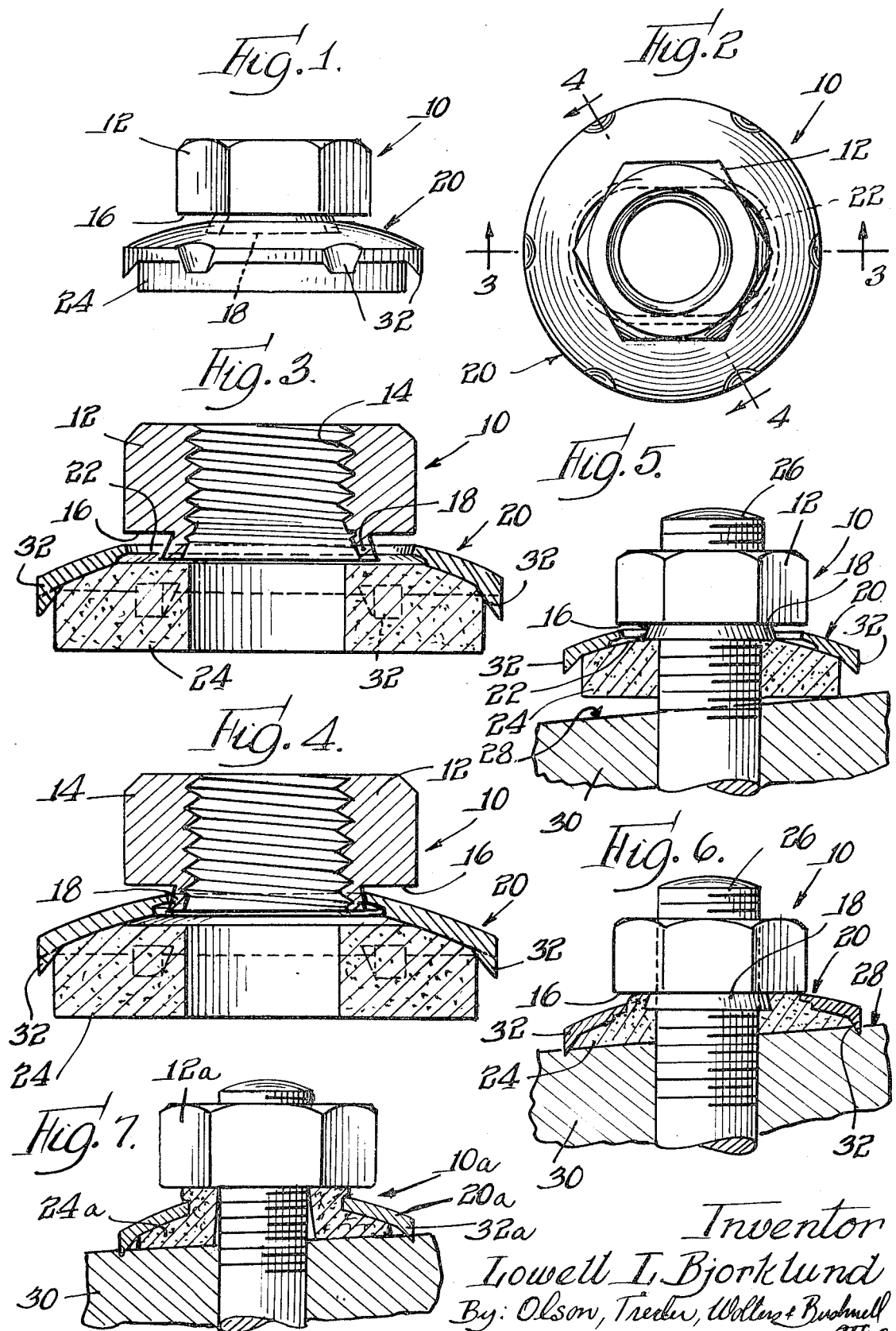

SEALING WASHER

Fastener units have heretofore been available which comprise a rotary threaded fastener such as a nut with a washer attached to the clamping side of the nut. Experience has shown that when such fastener units are tightened against a work surface which is inclined to the fastener axis, the washer will not adjust itself readily to such bearing or work surface. In fact, continued tightening of the fastener unit against an inclined bearing surface develop forces which may cause breakage of the stud to which the fastener unit is applied. It is therefore, an important object of the present invention to provide a fastener unit in which the washer element may be tightened against an inclined surface without causing breakage.

More specifically, the present invention contemplates a fastener unit of the type referred to above in which a rotary threaded fastener such as a nut has in association with a clamping side thereof a combined spring and sealing washer unit which will tilt as an incident to the engagement thereof with a bearing or work surface inclined to the axis of the rotary fastener.

It is still a further object of the present invention to provide in a fastener unit as above-mentioned, a combined tiltable spring and sealing washer arrangement in which the sealing washer serves to secure the spring washer against unauthorized separation from the rotary fastener.

The foregoing and other objects and advantages will be more apparent from the following detailed description when considered in connection with the accompanying drawing.

FIG. 1 is a side elevational view of a fastener unit of the type contemplated hereby;

FIG. 2 is a plan view of the fastener unit shown in FIG. 1;

FIG. 3 is an enlarged central axial sectional view of the fastener unit taken substantially along the line 3—3 of FIG. 2;

FIG. 4 is a central axial sectional view similar to FIG. 3, taken along the line 4—4 of FIG. 2;

FIG. 5 is a view of the fastener unit applied to a screw member disclosing the initial engagement of the sealing washer with an inclined work or bearing surface;

FIG. 6 is a view similar to FIG. 5 showing the fastener unit tightened against the inclined work surface; and, FIG. 7 discloses a modified form of fastener unit in which the sealing washer is adhered to the underside of the nut.

Referring now to the drawing more in detail wherein like numerals have been employed to designate similar parts throughout the various figures, it will be seen that a fastener unit of the type contemplated by the present invention is designated generally by the numeral 10. The fastener 10 includes a rotary threaded fastener member, or nut 12, having internal thread convolutions 14 and a work clamping surface 16. An annular flange or stub shank 18 extends axially from the clamping surface 16.

The fastener unit 10 also includes a spring type washer element 20, having an elongate, or substantially oval aperture 22. The length of the aperture 22, is substantially greater than the outer diameter of the flange 18, and the maximum width of the aperture 18 is slightly less than the maximum diameter of the flange 18. Thus, the washer 20 is secured against unauthorized axial separation from the nut 12 by the engagement of the margin defining the aperture 22 with the outer periphery of the flange 18. Carried along the underside or surface of the spring washer 20, is a resilient sealing washer 24. The sealing washer 24 may be adhesively secured to the underside of the washer 20.

By having a diametral dimension of the washer aperture 22 larger than the outer diameter of the flange 18, the washer is free to tilt to a limited extent upon engagement with an inclined work surface. This is clearly illustrated in FIGS. 5 and 6. In FIG. 5 the fastener unit 10 has been applied to a bolt or screw member 26 and an outer marginal portion of the sealing washer 24 has been moved into initial engagement with a surface 28 of a workpiece 30. As the fastener unit 10 is tightened against the surface 28 from the position shown in FIG. 5 to the final work clamping position shown in FIG. 6, the washer member 28 will be tilted with respect to the axis of the nut 12, and screw member 26. Thus, the spring washer 20 will automatically adjust its position to accommodate the inclination of the work surface 28, thereby relieving lateral stresses which might otherwise be experienced by the screw member 26. The washer 20 as disclosed herein is of the Belleville or Dome type and is provided with a plurality of work impinging teeth 32 along the margin thereof. As the fastener unit 10 is clamped against the work surface 28, as shown in FIG. 6, the teeth 32 aggressively impinge the work surface.

In FIG. 7 a slightly modified form of fastener unit is disclosed, said unit being designated generally by the unit 10a. The fastener unit 10a includes a rotary threaded fastener or nut 12a, a washer member 20a and a yieldable or resilient sealing washer 24a.

The previously described sealing washer 24 is secured to the undersurface of the washer 20, whereas the sealing washer 24a is adhesively secured directly to the underside or clamping surface 16a of the nut 12a. As will be seen in FIG. 7, an annular section of the sealing washer 24a actually extends through the washer aperture. Thus the sealing washer 24a serves to secure the spring washer 20a against unauthorized or inadvertent separation from the nut 12a. As the fastener unit 12a is tightened against a work surface, the spring washer 20a will tilt and thereby automatically adjust to the inclination to the work surface as previously described in connection with the fastener unit 10.

It will be noted that the inner margin of the washer 20 is reduced in thickness for the purpose of affording a maximum degree of tilt to the washer when clamped against an inclined work surface. By employing a fastener unit constructed in accordance with the teachings of the present invention, the spring washers will tilt sufficiently to avoid breakage of screw members to which the fastener unit is applied. The structure disclosed in FIG. 7, affords a maximum degree of tilt because of the specific arrangement of the sealing washer attached to the underside of the nut member. By having the sealing washer attached directly to the underside of the nut it is not necessary to employ the washer retaining flange disclosed in FIGS. 1–6 inclusive. Thus, a standard type nut may be converted into a fastener unit by simply attaching to the underside thereof the spring and sealing washer combination as shown in FIG. 7.

I claim:

1. A fastener unit including a rotary threaded fastener member having a work clamping surface, a spring washer adjacent said clamping surface, said washer having an elongated generally oval aperture with a maximum dimension sufficiently larger than the maximum diameter of the fastener threads to permit tilting of the washer with respect to the fastener axis, and a resilient sealing washer associated with the underside of said spring washer and extending axially beyond the clamping side thereof, said rotary threaded fastener including a frustoconical washer retaining shank means which extends axially from the work clamping surface into said washer aperture, the largest diameter of the shank means being greater than the smallest diameter of the elongated washer aperture to secure the washer against unauthorized axial separation from the rotary fastener, the inner margin of the sealing washer being circular and having a diameter generally corresponding to the diameter of the shank of the rotary threaded fastener therefore being adapted to extend into the washer aperture, and to be forced upwardly around the frustoconical shank to further secure the washers from unauthorized axial separation from the rotary fastener, the bending stress on an associated stud member being substantially decreased as a result of the capability of the washer to tilt about the longitudinal axis of the stud.

* * * * *

UNITED STATES PATENT OFFICE
CERTIFICATE OF CORRECTION

Patent No. 3,678,979     Dated July 25, 1972

Inventor(s) Lowell L. Bjorklund

It is certified that error appears in the above-identified patent and that said Letters Patent are hereby corrected as shown below:

Change the inventor's name as misspelled "Bjorklumd" to --Bjorklund--

Signed and sealed this 30th day of January 1973.

(SEAL)
Attest:

EDWARD M. FLETCHER, JR.        ROBERT GOTTSCHALK
Attesting Officer              Commissioner of Patents